(12) United States Patent
Burke et al.

(10) Patent No.: US 9,183,835 B2
(45) Date of Patent: *Nov. 10, 2015

(54) SPEECH-BASED USER INTERFACE FOR A MOBILE DEVICE

(71) Applicant: GM Global Technology Operations LLC, Detroit, MI (US)

(72) Inventors: Denis R. Burke, Canton, MI (US); Danilo Gurovich, Grosse Pointe Farms, MI (US); Daniel E. Rudman, Rochester Hills, MI (US); Keith A. Fry, Rochester Hills, MI (US); Shane M. McCutchen, Howell, MI (US); Marco T. Carnevale, Windsor (CA); Mukesh Gupta, Framington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/628,657

(22) Filed: Sep. 27, 2012

(65) Prior Publication Data

US 2013/0197915 A1    Aug. 1, 2013

Related U.S. Application Data

(60) Provisional application No. 61/548,719, filed on Oct. 18, 2011.

(51) Int. Cl.
*G10L 21/00* (2013.01)
*G10L 25/00* (2013.01)
(Continued)

(52) U.S. Cl.
CPC ............... *G10L 15/265* (2013.01); *G10L 21/06* (2013.01); *H04M 1/6083* (2013.01); *H04M 2250/74* (2013.01); *H04W 92/08* (2013.01)

(58) Field of Classification Search
CPC .............................. G10L 15/22; G10L 15/265
USPC ............................. 704/244, 270, 270.1, 275
See application file for complete search history.

(56) References Cited

U.S. PATENT DOCUMENTS 5,748,974 A * 5/1998 Johnson ........................ 704/9
5,805,775 A * 9/1998 Eberman et al. ............ 706/11
(Continued)

FOREIGN PATENT DOCUMENTS

CN    101635766 A    1/2010
CN    201584962 U    9/2010
(Continued)

OTHER PUBLICATIONS

German Office Action corresponding to German Patent Application 10 2012 218 934.3, dated Dec. 30, 2014, 14 pages.
(Continued)

*Primary Examiner* — Shaun Roberts
(74) *Attorney, Agent, or Firm* — Anthony L. Simon; Reising Ethington P.C.

(57) ABSTRACT

A method of providing hands-free services using a mobile device having wireless access to computer-based services includes carrying out a completed speech session via a mobile device without any physical interaction with the mobile device, wherein the speech session includes receiving a speech input from a user, and obtaining from a cloud service a service result responsive to the speech input, and providing the service result as a speech response presented to the user.

12 Claims, 9 Drawing Sheets

(51) Int. Cl.
*G10L 15/26* (2006.01)
*H04M 1/60* (2006.01)
*G10L 21/06* (2013.01)
*H04W 92/08* (2009.01)

(56) References Cited

U.S. PATENT DOCUMENTS

| | | | |
|---|---|---|---|
| 6,233,559 B1* | 5/2001 | Balakrishnan | 704/275 |
| 7,188,067 B2* | 3/2007 | Grant et al. | 704/275 |
| 7,212,970 B2* | 5/2007 | Rodrigo | 704/275 |
| 7,349,722 B2 | 3/2008 | Witkowski et al. | |
| 7,437,295 B2* | 10/2008 | Pitts et al. | 704/275 |
| 7,693,720 B2* | 4/2010 | Kennewick et al. | 704/275 |
| 8,090,367 B2 | 1/2012 | Kameyama | |
| 8,332,218 B2* | 12/2012 | Cross et al. | 704/231 |
| 2001/0047258 A1 | 11/2001 | Rodrigo | |
| 2003/0030666 A1 | 2/2003 | Najmi et al. | |
| 2005/0021336 A1* | 1/2005 | Katsuranis | 704/246 |
| 2005/0170777 A1 | 8/2005 | Harwood et al. | |
| 2007/0027852 A1 | 2/2007 | Howard et al. | |
| 2008/0032742 A1* | 2/2008 | Celik et al. | 455/558 |
| 2008/0140408 A1 | 6/2008 | Basir | |
| 2009/0070113 A1* | 3/2009 | Gupta et al. | 704/257 |
| 2010/0022231 A1 | 1/2010 | Heins et al. | |
| 2010/0151788 A1 | 6/2010 | Rahman et al. | |
| 2010/0250243 A1 | 9/2010 | Schalk et al. | |
| 2011/0161077 A1* | 6/2011 | Bielby | 704/231 |
| 2012/0245945 A1* | 9/2012 | Miyauchi et al. | 704/275 |
| 2013/0102295 A1 | 4/2013 | Burke et al. | |
| 2013/0103404 A1 | 4/2013 | Burke et al. | |
| 2013/0197907 A1 | 8/2013 | Burke et al. | |

FOREIGN PATENT DOCUMENTS

| | | |
|---|---|---|
| KR | 1020050122720 A | 12/2005 |
| WO | 2011088053 A2 | 7/2011 |

OTHER PUBLICATIONS

US Office Action for U.S. Appl. No. 13/628,875, dated Oct. 31, 2014, 23 pages.
US Office Action for U.S. Appl. No. 13/628,703, dated Feb. 2, 2015, 15 pages.
German Office Action corresponding to German Patent Application 10 2012 218 934.3, dated Dec. 1, 2014, 14 pages.

* cited by examiner

SPEECH-BASED USER INTERFACE FOR A MOBILE DEVICE

TECHNICAL FIELD

The present invention relates to speech interfaces to computer-based services obtained wirelessly from a cellular phone or other mobile device, and to such interfaces implemented in a vehicle such as a passenger car.

BACKGROUND

Speech-based human-machine interfaces (HMI) to vehicle functions and cellular phone functions and applications typically involve an application-specific or function-specific limited command set that requires syntactically constrained interactions between the user and HMI. In these systems, inputted speech may be converted into a specific command for a specific application, but there is typically only limited ability to identify and carry out different services involving different applications or service providers.

In the realm of cellular phone use in vehicles, systems have been proposed and some implemented that help reduce driver distraction by providing a hands-free telephony experience as well as carry out some basic vehicle control tasks, such as selecting and controlling radio and other infotainment services on the vehicle. In some systems, this is done using an embedded cellular phone that has access to at least portions of the vehicle electronics so as to permit control and reporting via a speech user interface. In other vehicles, the driver or other occupant's personal mobile device (e.g., cellular phone) is used for this purpose, with the vehicle providing a basic audio interface that includes a microphone and one or more speakers, as well as a Bluetooth or other wireless connection to the mobile device. This permits speech and other audio to be sent between the audio interface and mobile device in either direction. However, these systems are typically limited to only enabling a few basic mobile device functions such as calling and controlling music selection and playback. They do not provide access to the many other built-in and user added applications and functions typically available today.

For example, there is now widespread availability and use of mobile devices such as smartphones that permit user downloading and installing of relatively small software applications (apps). Some of these smartphones have built-in speech support, either via the operating system (OS), such as in the case of the Android™ OS, or via a built-in app such as Siri™ available on the iPhone4S™. See, for example, WO2011088053 published Jul. 21, 2011. While providing a greater level of integration, these commercially-available systems are not configured to provide a fully hands-free experience with the mobile device since they still rely heavily on the screen to interact with the user during the speech session.

SUMMARY OF THE INVENTION

According to an aspect of the invention, there is provided a method of providing hands-free services using a mobile device having wireless access to computer-based services. The method includes carrying out a completed speech session via a mobile device without any physical interaction with the mobile device, wherein the speech session includes receiving a speech input from a user, and obtaining from a cloud service a service result responsive to the speech input, and providing the service result as a speech response presented to the user.

According to another aspect of the invention, there is provided a method of providing hands-free services using a mobile device having wireless access to computer-based services. The method includes receiving speech input at a mobile device via a wireless personal area network; sending the speech input from the mobile device to an automated speech recognition (ASR) system via a wireless communication system; receiving from the ASR system speech recognition results representing at least portions of the speech input; determining a session context at the mobile device based on the speech recognition results; determining a desired service associated with the session context; sending a service request to the desired service; receiving a service result from the desired service; generating a speech response using the service result; and sending the speech response as audio speech from the mobile device via the wireless personal area network.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below provide a mobile voice platform that (1) enable hands-free communication between a vehicle occupant and the occupant's cellular phone or other mobile device without the need to physically interact with the mobile device, and (2) does so in a manner that enables broad support to some or all of the Internet-based and other computer-based services available to the user via the mobile device. As used herein, "services" generally include the provision of information, control, and/or communication assistance to the mobile device user. Further, as used herein, a service being used on or accessed via the mobile device includes those provided by way of applications installed on the mobile device as well as computer-based services that are only available by communication with a remote server. These latter computer-based services are also referred to as "cloud services" and may be supplied by any service provider having an accessible server that is available over a private or public network, such as an intranet or the Internet.

Figure 1:
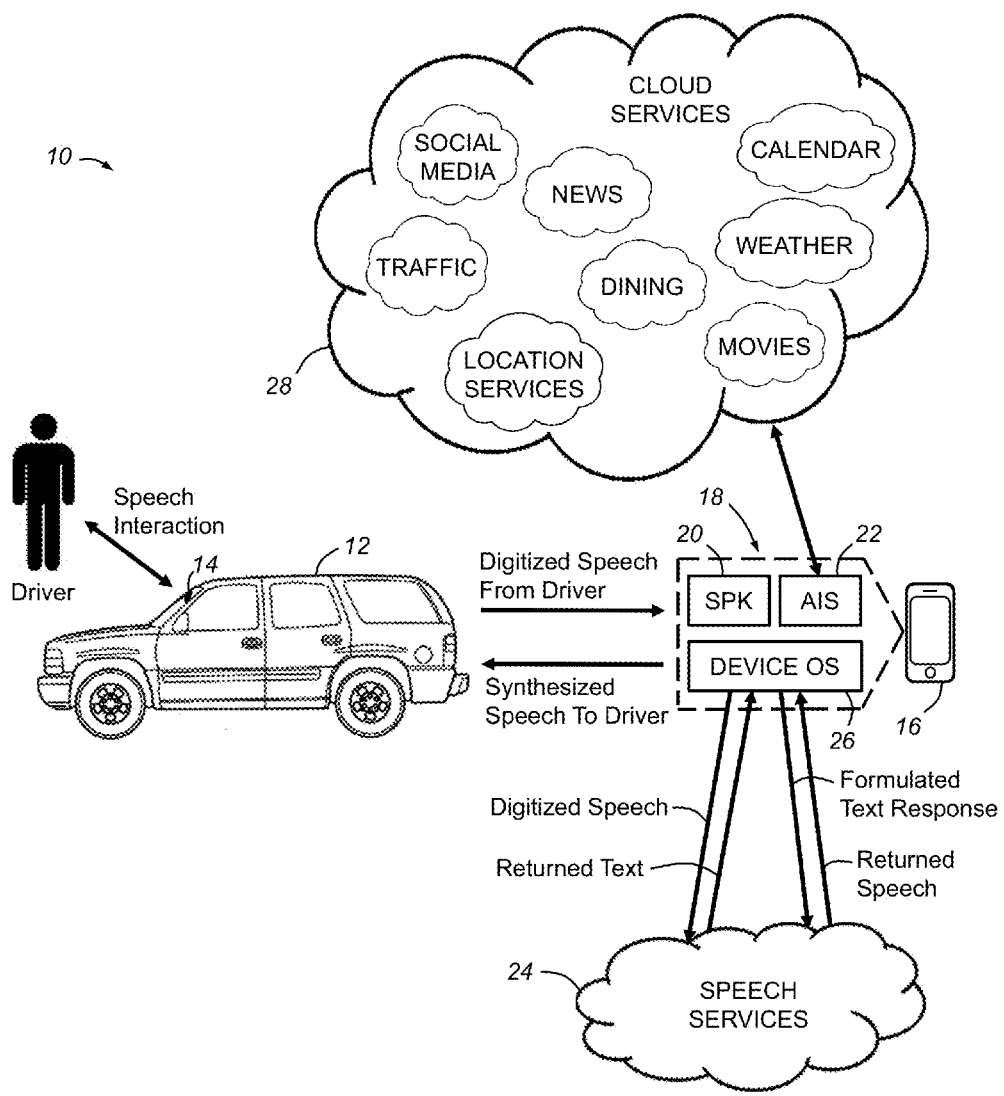
FIG. 1 diagrammatically depicts the portions of the hardware and methodology used to provide a speech user interface in accordance with an embodiment of the invention.

FIG. 1 depicts one embodiment of a speech-based user interface 10 as it could be used for providing services via a mobile device to a vehicle driver in a hands-free manner. As used herein "hands-free" means that the user can or has carried out some or all of a completed speech-based session using the mobile device without physical interaction or control of the device. "Fully hands-free" means that the user can or has carried out all of a completed speech-based session using the mobile device without physical interaction or control of the device. Some embodiments can be implemented to provide a hands-free experience that may require some interaction with the mobile device, such as to place it in a listening mode, while other embodiments can be carried out fully hands-free while, for example, the mobile device is in the user's pocket, purse, or briefcase, with no physical access needed to the device.

In the illustrated embodiment, a driver of a vehicle 12 interacts via speech with an on-board, installed audio user interface 14 that communicates via a short range wireless connection with the driver's mobile device 16, which in this case is a cellular phone. Mobile device 16 can be any portable device capable of wireless communication and digital processing whether using a microprocessor or some simpler or more complex circuitry. Thus, mobile devices include cellular phones, PDAs, laptops, notebooks, netbooks and other personal electronic devices. The cellular phone 16 depicted in FIG. 1 is commonly referred to as a smartphone given that it permits the user to add software applications (apps) to the smartphone that perform functions beyond telephony. Phone 16 includes a touchscreen interface, one or more manual pushbuttons, a microphone, speaker, and internal circuitry (hardware) including a microprocessor, memory for storage of software and data, and communication circuitry that includes at least short range wireless communication technology such as Bluetooth and/or WiFi, but also cellular communication technology such as a cellular chipset for CDMA, GSM, or other standardized technology. These various components of mobile device 16 may be conventional if desired, and thus are not separately illustrated or described in detail herein.

Apart from the mobile device hardware, cellular phone 16 includes a mobile voice platform (MVP) 18 comprising software running on the mobile device. MVP 18 includes a speech platform kernel (SPK) 20 and an application interface suite (AIS) 22, both of which are program modules comprising computer instructions that, upon execution by the device's processor, carry out their respective modules functions, as will be described below. Rather than providing automated speech processing (ASR) on the mobile device itself, remotely located (cloud) speech services 24 are used, although in some embodiments ASR can be carried out on the mobile device 16, either with or without access to remotely located speech modules, grammars, and computing facilities. Mobile device 16 also includes an operating system (OS) 26 that provides root level functions, including for example inter-application communication mechanisms and input/output (I/O) interfacing between device hardware and the software modules and applications running on device 16. Included in these hardware interfacing functions of the OS are the communication protocols used by the device to communicate with the speech services 24 as well as other cloud services 28 that are available via the Internet or other network. Any computer-based service can be included in the list of cloud services 28, but shown in FIG. 1 are some of those services most useful to users of cellular phones; i.e., social media, location services (e.g., navigation), traffic, weather, news, calendaring, dining, and movies. Many others exist.

In general, hands-free access to services using mobile voice platform 18 will involve carrying out a completed speech session via mobile device 16 without any physical interaction with the mobile device. This broadly includes receiving a speech input from a user, obtaining a service result from a cloud service that is responsive to the content of the speech input, and providing the service result as a speech response presented to the user. Using vehicle 12 of FIG. 1, the driver (user) may interact with the mobile device to carry out the speech session via the audio interface 14. This may include establishing a short range wireless connection between the in-vehicle audio interface 14 and mobile device 16 that then allows the microphone and speaker of the audio interface to be used to receive and present speech, respectively, to the driver or other occupant. The speech input may be sent as digitized speech over this short range wireless connection via a digital communication protocol such as Bluetooth or WiFi. The digitized speech input may then be sent from the mobile device 16 via a cellular or other wireless communication system to the speech services 24 to carry out speech-to-text (STT) services that involve automated speech recognition, or text-to-speech (TTS) services that provide either synthesized or recorded speech or speech portions (e.g., phenomes) for use in generating an audio message that provides a suitable speech response to the speech input. The speech recognition results (e.g., returned text) is then processed by the SPK 20 to ultimately determine the appropriate (desired) service to be used to carry out the user's request. Once the desired service(s) have been determined, a service request is formed using the commands and parameters supported by the particular service selected using one or more service interfaces from the application interface suite (AIS) 22, as will be discussed in greater detail below. The service request is sent to the desired service (installed app and/or cloud service) and a service result is received back. That service result is then used to generate a natural language speech response; that is, using conversational language and sentence/clause structures that are familiar and context-specific. The speech response may be an audio message that is initially built as a text response from information in the service result as well as from other available information such as session variables and context-specific items, as will be discussed in greater detail below. Once the text response has been formulated, it is converted to an audio speech response (e.g., audio message), and this can be done either on the mobile device 16 itself, or using the TTS services 24. The audio message may then be sent from the mobile device to the audio interface via the short range wireless connection for presentation to the vehicle occupant over the vehicle speaker (s).

Figure 2:
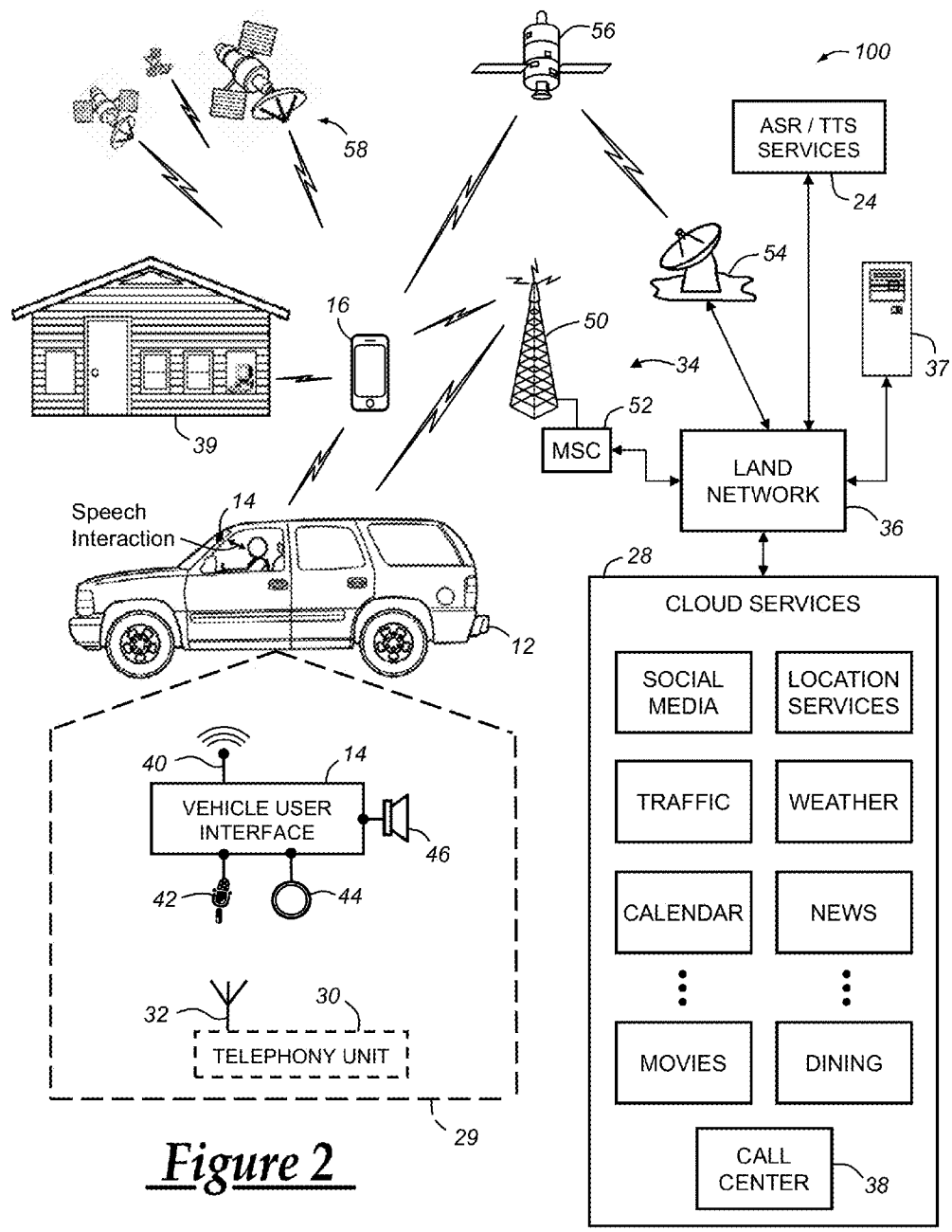
FIG. 2 is a block diagram depicting an embodiment of a communications system that is capable of utilizing the speech user interface of FIG. 1 as well as the methods disclosed herein.

Turning now to FIG. 2, there is shown an operating environment that comprises a mobile vehicle communications system 100 that incorporates the speech-based user interface (SUI) 10 and that can be used to implement the methods disclosed herein. Communications system 100 generally includes the vehicle 12 and its audio interface 14, mobile device 16, speech services 24, and cloud services 28, as well as some of the system infrastructure not shown in FIG. 1, including one or more wireless carrier systems 34 and a land communications network 36. Other optional equipment, facilities, and systems can be included, such as a computer 37, call center 38, residence or other fixed local area network facility 39, satellite communication system with fixed antenna 54 and one or more satellites 56, and also a constellation 58 of GPS satellite for navigation. It should be understood that the disclosed method can be used with any number of different systems and is not specifically limited to the operating environment shown here. Also, the architecture, construction, setup, and operation of the components of system 100 not described herein are generally known in the art. Thus, the following paragraphs simply provide a brief overview of one such communications system 10; however, other systems not shown here could employ the disclosed method as well.

Vehicle 12 is depicted in the illustrated embodiment as a sports utility vehicle (SUV), but it should be appreciated that any other vehicle including passenger cars, trucks, motorcycles, recreational vehicles (RVs), marine vessels, aircraft, etc., can also be used. Some of the vehicle electronics 29 are shown generally in FIG. 2 and include a telematics or telephony unit 30 that communicates wirelessly with carrier system 34 via an antenna 32 and other circuitry known to those skilled in the art. Vehicle electronics 29 also include the audio user interface 14 which includes an antenna 40 for short range wireless communication, a microphone 42, one or more pushbuttons or other control inputs 44, and one or more speakers 46. Other user interface components can be included in the vehicle or as a part of the audio user interface 14, such as a visual display (not shown). The audio user interface 14 may be a substantially standalone set of components communicating only via antenna 40, or may be hardwired or otherwise connected into other modules or portions of the vehicle's electronics system, such as to telephony unit 30 and/or a vehicle bus. As used herein, the term "audio user interface" broadly includes any suitable installation of a microphone and speaker in the vehicle, including both hardware and any software components, which enables a vehicle user to communicate verbally with the vehicle or other devices in the vehicle, such as mobile device 16. Microphone 42 provides audio input that can be sent via the short range wireless connection using antenna 40. One or more pushbutton(s) 44 allow manual user input into the audio user interface to initiate actions such as the start of a speech session in which the microphone 42 and speaker 46 are used to provide the user with hands-free services in the vehicle such as to carry out wireless telephone calls or access data, provide remote control or provide messaging and communication services. The pushbutton may be located in a convenient spot for the driver, such as on the steering wheel hub or spokes. Speaker 46 may be a single speaker dedicated for use with the audio user interface 14 or may be integrated with other components or systems, such as a radio system speaker.

In the illustrated embodiment, telephony unit 30 is an optional component that is not used in carrying out the operation of the speech user interface (SUI) 10, but in other embodiments can be included and can be integrated in with the audio user interface as a single functional module. Telephony unit 30 can be an OEM-installed (embedded) or aftermarket device that is installed in the vehicle and that enables wireless voice and/or data communication over wireless carrier system 34 and via wireless networking. This enables the vehicle to communicate with call center 38, other telematics-enabled vehicles, or some other entity or device. The telephony unit preferably uses radio transmissions to establish a communications channel (a voice channel and/or a data channel) with wireless carrier system 34 so that voice and/or data transmissions can be sent and received over the channel. By providing both voice and data communication, telephony unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 38) and data communication (e.g., to provide GPS location data or vehicle diagnostic data to the call center 38), the system can utilize a single call over a voice channel and switch as needed between voice and data transmission over the voice channel, and this can be done using techniques known to those skilled in the art. For location services, the telephony unit may have its own GPS circuitry, or can utilize other available GPS devices, such as one installed in the vehicle as a part of a vehicle navigation system, or using one from the mobile device 16.

Wireless carrier system 34 is preferably a cellular telephone system that includes a plurality of cell towers 50 (only one shown), one or more mobile switching centers (MSCs) 52, as well as any other networking components required to connect wireless carrier system 34 with land network 36. Each cell tower 50 includes sending and receiving antennas and a base station, with the base stations from different cell towers being connected to the MSC 52 either directly or via intermediary equipment such as a base station controller. Cellular system 34 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 34. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 34, a different wireless carrier system in the form of satellite communication can be used to provide uni-directional or bi-directional communication with the vehicle. This can be done using one or more communication satellites 56 and an uplink transmitting station 54. Uni-directional communication can be, for example, satellite radio services, wherein programming content (news, music, etc.) is received by transmitting station 54, packaged for upload, and then sent to the satellite 52, which broadcasts the programming to subscribers. Bi-directional communication can be, for example, satellite telephony services using satellite 56 to relay telephone communications between the vehicle 12 and station 54. If used, this satellite telephony can be utilized either in addition to or in lieu of wireless carrier system 34.

Land network 36 may be a conventional land-based telecommunications network that is connected to one or more landline telephones and connects wireless carrier system 34 to such things as speech services 24, cloud services 28, and other computers or servers 37, such as a personal computer located in a residence 39 or other facility. For example, land network 36 may include a public switched telephone network (PSTN) such as that used to provide hardwired telephony, packet-switched data communications, and the Internet infrastructure. One or more segments of land network 36 could be implemented through the use of a standard wired network, a fiber or other optical network, a cable network, power lines, other wireless networks such as wireless local area networks (WLANs), or networks providing broadband wireless access (BWA), or any combination thereof. Furthermore, the various speech and cloud services shown in FIG. 2 need not be connected via land network 36, but could include wireless telephony equipment so that it can communicate directly with a wireless network, such as wireless carrier system 34.

Computer 37 can be one of a number of computers accessible via a private or public network such as the Internet. Each such computer 37 can be used for one or more purposes, such as a web server accessible by the vehicle over wireless carrier 34 via audio user interface 14/mobile device 16, and/or via telephony unit 30. Other such accessible computers 37 can be, for example: a service center computer where diagnostic information and other vehicle data can be uploaded from the vehicle via the telephony unit 30; a client computer used by the vehicle owner or other telematics service subscriber for such purposes as accessing or receiving vehicle data or to setting up or configuring subscriber preferences or controlling vehicle functions; or a third party repository to or from which vehicle data or other information is provided. A computer 37 can also be used for providing Internet connectivity such as DNS services or as a network address server that uses DHCP or other suitable protocol to assign an IP address to the vehicle 12 and/or to the mobile device 16. When used as a client computer 37 by the vehicle owner, such as within a residence 39, wireless connectivity between the mobile device 16 and computer 37 may be provided using any suitable short range wireless communication technology, such as Bluetooth or any of the 802.11 protocols.

Shown in FIG. 2 as one of the cloud services is a call center 38 which can be used to provide the vehicle operator and/or the vehicle electronics 29 with a number of different vehicle-related services and system back-end functions. These include such things as roadside or emergency assistance, diagnostic and maintenance support, entertainment services, information and navigation assistance, etc., as is known in the art. These call center services can be provided to supplement those accessible to the vehicle operator via the speech user interface 10, or as a backup in case the operator is having difficulty with the speech user interface.

Figure 3:
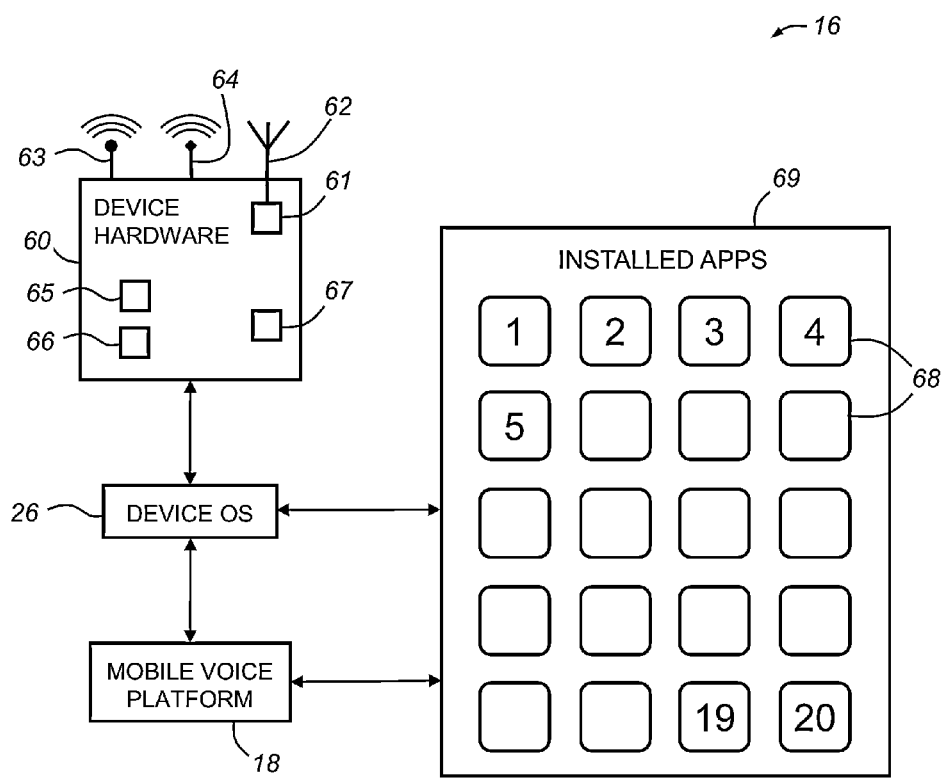
FIG. 3 is a block diagram of some of the hardware and software components of the mobile device depicted in FIGS. 1 and 2.

Although shown outside the vehicle in FIGS. 1 and 2 solely for diagrammatic illustration, the typically use of the mobile device 16 as a part of the speech user interface 10 will involve circumstances in which the mobile device in located in the vehicle, such as when the driver is operating the vehicle on the roadway. Some of the basic functional hardware and software components of mobile device 16 are depicted in FIG. 3. According to the embodiment shown, mobile device 16 is a smartphone that utilizes cellular communication according to GSM and/or CDMA standards and thus includes a standard cellular chipset 61 and antenna 62 for voice and data communications, antenna 63 and 64, and their associated circuitry for Bluetooth and WiFi wireless connections, respectively, an electronic processing device 65, one or more digital memory devices 66, and a GPS receiver 67.

Processor 65 can be any type of device capable of processing electronic instructions including microprocessors, microcontrollers, host processors, controllers, vehicle communication processors, and application specific integrated circuits (ASICs). Processor 65 executes various types of digitally-stored instructions, such as software or firmware programs stored in memory 66. This includes the device OS 26, the mobile vehicle platform 18, and any installed apps 68, all of which can be stored in memory 66.

GPS module 67 receives radio signals from a constellation 58 of GPS satellites. From these signals, the module 67 can determine mobile device position that is used for providing navigation and other position-related services. Navigation information can be presented on the device's display 69 or can be presented verbally via the device's own speaker (not shown) or via the audio user interface 14, such as may be done for supplying turn-by-turn navigation.

In general, the speech user interface 10 may be realized in part using the mobile voice platform 18 that runs on the device OS 26 and interfaces with installed apps 68, cloud services 28, or both to carry out services for the user based on their speech input. Further details of the mobile voice platform and its interaction with the other components of mobile device 16 are shown in FIGS. 4 and 5.

Figure 4:
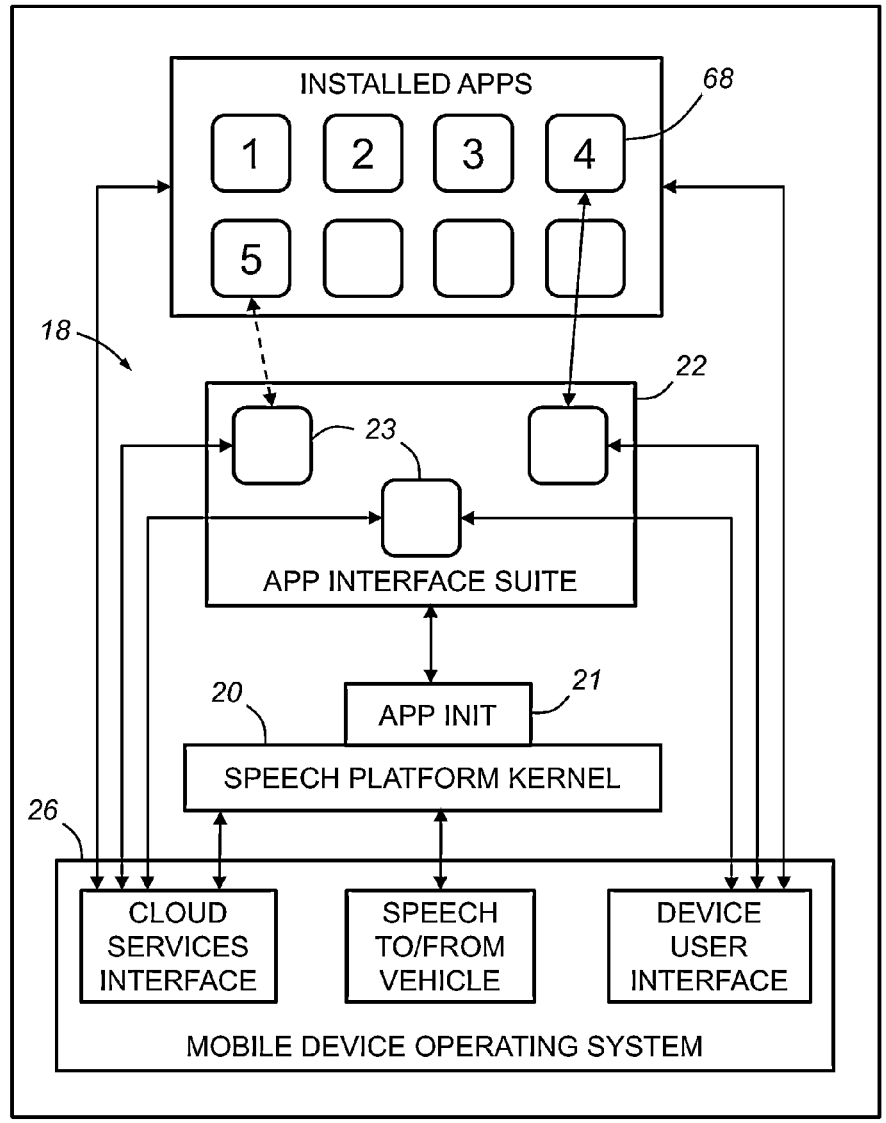
FIG. 4 depicts the tiered software structure and program module interactions of the mobile voice platform and operating system used on the mobile device of FIGS. 1-3.
Figure 5:
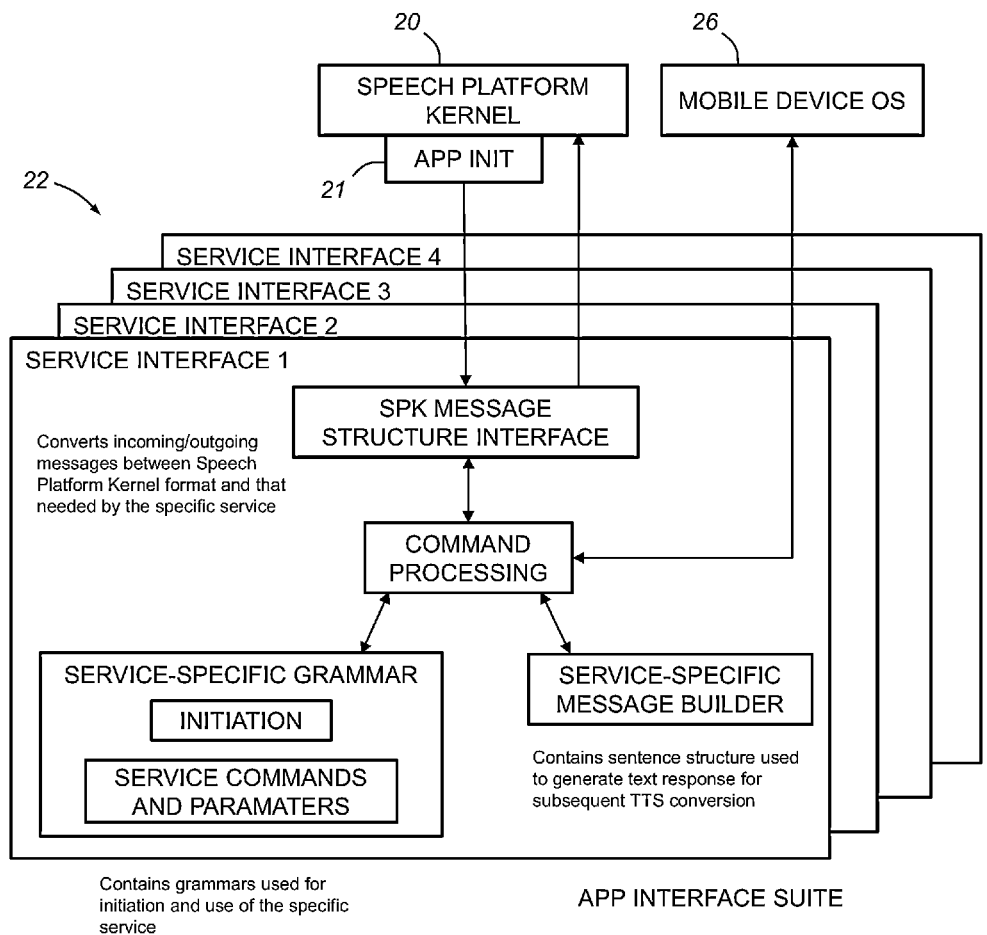
FIG. 5 depicts further details concerning the structure of service interfaces used in the application interface suite of FIG. 4.

FIG. 4 depicts different program modules each of which provide computer instructions that, upon execution by the processor 65, carry out their programmed functions using the device OS 26 to interface with the various hardware portions of the device 16. The mobile voice platform 18 includes the speech platform kernel (SPK) 20 and app interface suite (AIS) 22. SPK 20 includes an app initiator module 21 that is used to initiate a service call from SPK 20 to a service on the device (e.g., one of the apps 68) or in the cloud (e.g., one of the cloud services 28). AIS 22 includes a number of individual application service interfaces 23, each of which is associated with one of the different services available to mobile voice platform 18. The individual functions performed by the different layers is as follows:

Device OS 26:
  Provides underlying communication with Bluetooth and device connectivity controls
  Provides mobile device media player function for causing audio files to play through the speakers
  Provides microphone-driven speech recognition system for converting spoken speech into a text equivalent
  Provides inter-application communication mechanisms Speech Platform Kernel 20:
  Manages all high-level Bluetooth integration with the vehicle 12
  Provides consistent vocabulary and mechanisms for dealing with common voice interactions such as failure, pardon (didn't quite understand you), and quitting
  Processes converted speech-to-text into command structures for use by apps
  Maintains high-level app preferences related to Bluetooth devices, request management
  Provides logging and security management
  Maintains control over audio and microphone channels, including audio focus and gain levels at appropriate times Service Interfaces 23:
  Uses a standardized command/parameter I/O protocol to interface with SPK
  Defines the grammars it supports for initiation
  Defines the grammars it supports when app is active
  Processes incoming speech-to-text command structures provided by SPK 20 and converts them into desired actions
  Connects to cloud services in order to send and receive information needed to process request
  Provides any desired device display 69 user interface As indicated above and in FIG. 4, SPK 20 runs on top of the operating system 26 and handles the overall control and routing of messaging used for the mobile voice platform. SPK 20 provides inter-module commands to carry out the basic process flow of the speech session according to the methodology discussed above in connection with FIG. 1 and shown in FIGS. 6-8. During a speech session in which an input (e.g., a request or command) is received from a user, SPK 20 handles speech processing of the speech recognition results returned by the cloud-based automated speech recognition (ASR) service. This is done using a post-ASR service-identifying grammar specifically designed with a vocabulary intended to identify a desired service or session context from the speech recognition results. Built into this functionality is error handling and building of natural language responses for returning a speech response to the user. A session context (e.g., navigation v. messaging v. dining reservations) may also be determined at SPK 20 using this first grammar, and the session context can be used to further restrict the choice of services selected by SPK 20, or to aid in the post-ASR processing of the speech recognition result. Each speech session has at least one context; that is, at least one subject matter domain to which the user's speech input relates. The different cloud services shown in FIGS. 1 and 2 indicate some of the various session contexts that can be identified and distinguished. For any speech session, there may be a primary session context and one or more ancillary service contexts. For example, making dining reservations might invoke a dining session context in which the primary message contents being sought for include an identification of restaurant, number of people in the party, reservation time, etc. But it may also invoke a navigation context wherein directions to the restaurant are desired. Or a message context in which notification of the reservation is shared with others. SPK 20 not only determines a primary session context, but one or more ancillary ones, if appropriate, and for each, identifies an appropriate cloud or installed service.

The speech services identified in FIGS. 1 and 2 can be implemented in various ways and in some embodiments, may be uniquely designed or contain specific grammars or models designed to support the speech user interface 10. In other embodiments, a generalized cloud ASR service is used; that is, one in which, although it may permit parameter specifications for particular language models and other general configurations of the speech recognition engine, does not use a grammar tailored to the session contexts expected for the user speech session. The android speech functionality available from Google is one example of a generalized cloud ASR service.

Once SPK 20 has identified or otherwise determined a desired service, it uses the App Init 21 to start the selected service via a service interface 23 associated with that service. As indicated in FIG. 4, some of the service interfaces 23 interact only with cloud services, or only with cloud services and the device user interface (e.g., display 69), whereas others interface with the installed apps (e.g., app 4) that itself may access cloud services using the operating system's interface to the cloud services.

Turning now to FIG. 5, further detail of the service interfaces 23 is shown. Each service interface 23 includes a SPK message structure interface that follows the standardized I/O protocol used by SPK 20 for messaging to the service interfaces. This provides a common framework for interacting with the mobile voice platform so that new services can be accessed by creating a service interface that meets the SPK 20 I/O specification while identifying to SPK 20 the commands and parameters needed to call and receive results from the service. The service interface includes command processing that uses a service-specific grammar to construct a service request and then send that service request to the cloud service or installed app via the OS 26. The service-specific grammar is one that includes vocabulary used for initiating and commanding the service.

The App Init module 21 of SPK 20 can be implemented with the same structure as the service interfaces, except that it is a special purpose interface that is used by SPK 20 to contact a selected service interface to initiate the service and pass the needed commands and parameters used by the service.

Figure 6:
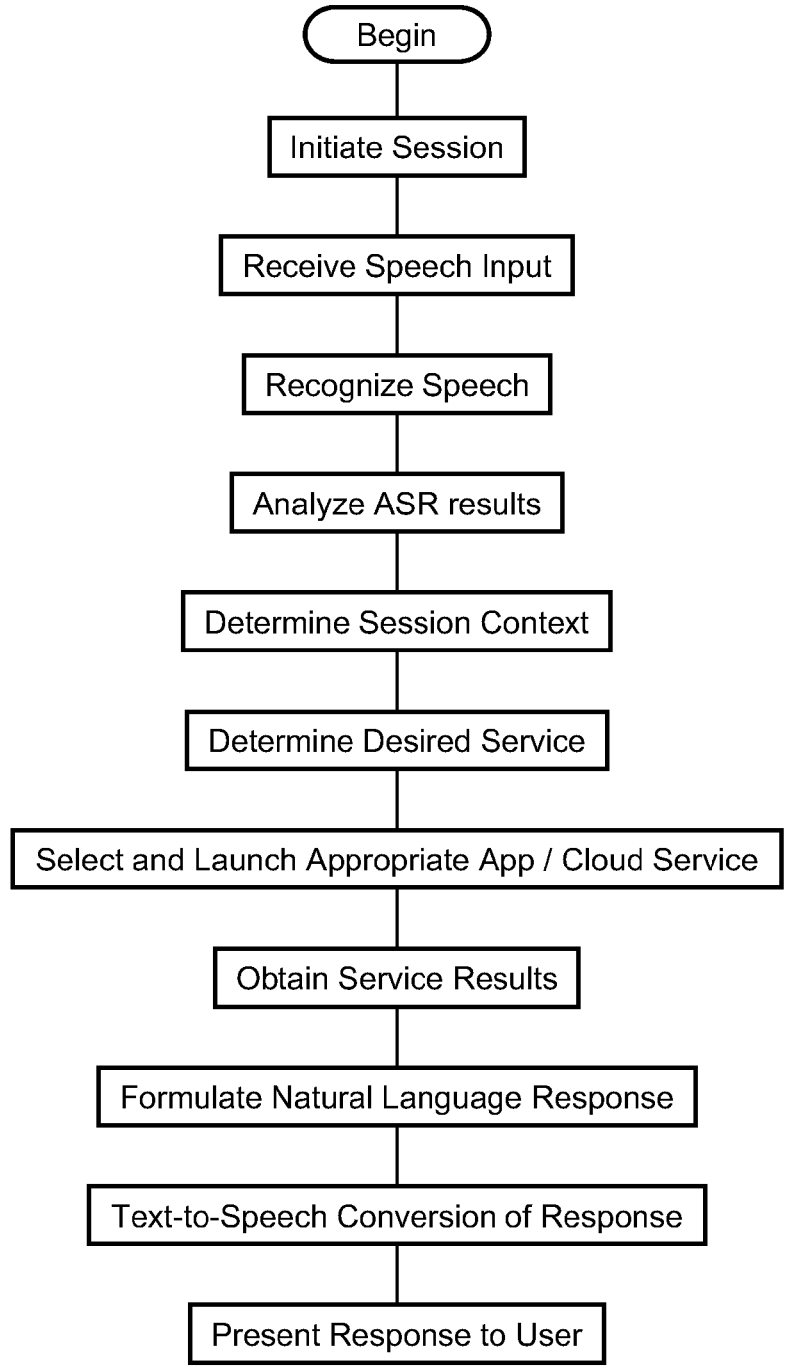
FIG. 6 is a flowchart of a method that can be used with the speech user interface of FIGS. 1 and 2 to provide a user with a completed hands-free speech session.

FIG. 6 depicts a flowchart of a complete speech session that can be used to provide hands free or even fully hands free operation of the mobile device by a driver in a vehicle. The flowchart includes initiating a session, such as via a button press or a voice command. Speech input can be received via a vehicle microphone or a phone microphone. Speech can be recognized via an upload to the server, onboard the vehicle, or on the mobile device. ASR results can be analyzed, such as using post-ASR grammar, which can be based on what apps are present. A session context can be determined based on specific words/phrases (e.g., business lookup, navigation, scheduling). A desired service is desired based on specific words/phrases (e.g., "what restaurants," "give me directions to"). An appropriate App/Cloud Service can be selected and launched using stored data identifying which apps/cloud partner to perform which service. Service results are obtained (results are received from app(s)/cloud service(s). A natural language response is formulated (programmed rules and phrases to build sentences and provide app-interdependent grammar to the user). The response is converted using text-to-speech (upload to server, onboard vehicle, or on mobile device) and a response is presented to a user via vehicle speaker or phone speaker.

Figure 7:
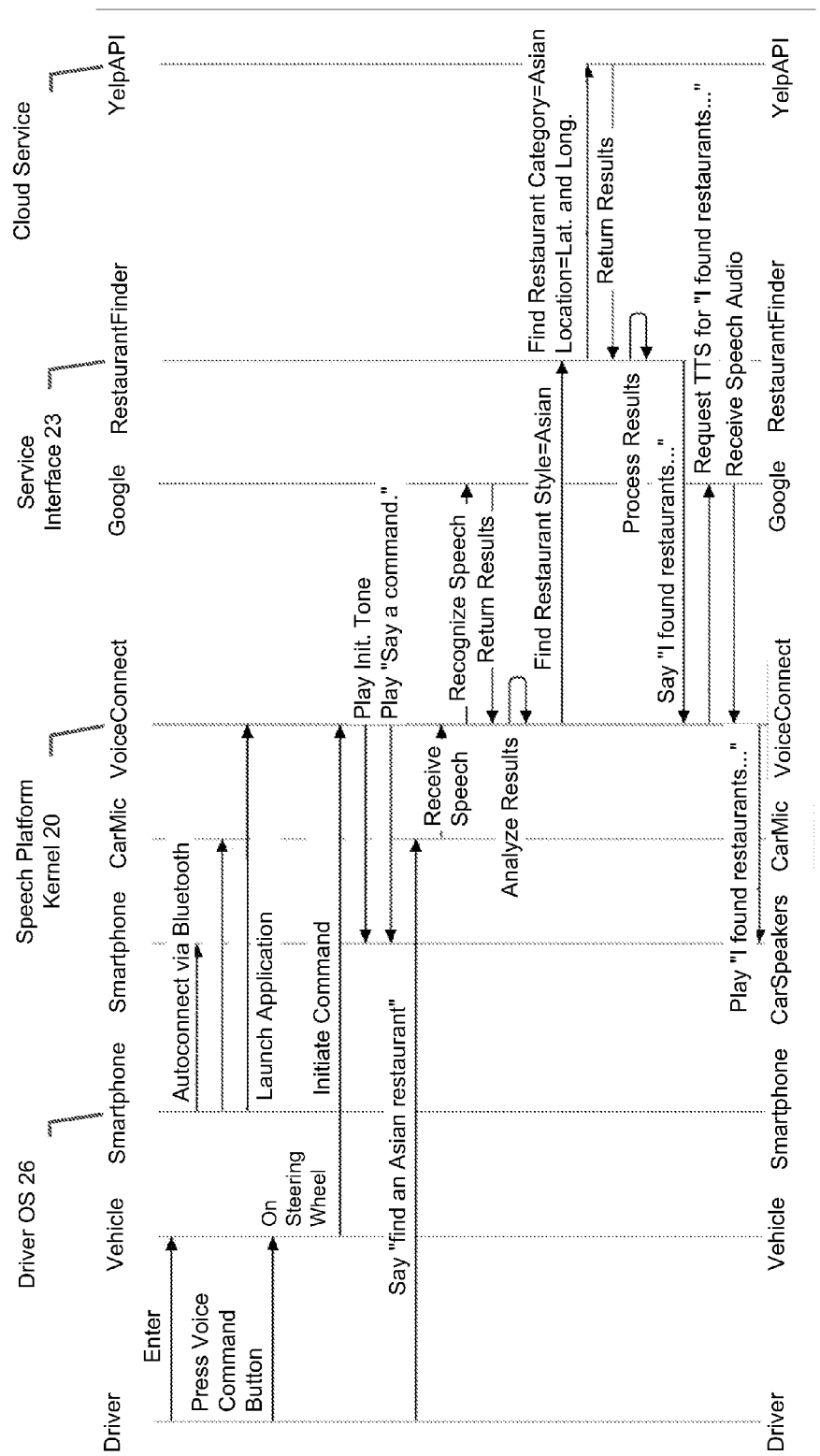
FIG. 7 is a sequence diagram showing messaging flows for a sample speech session.
Figure 8A:
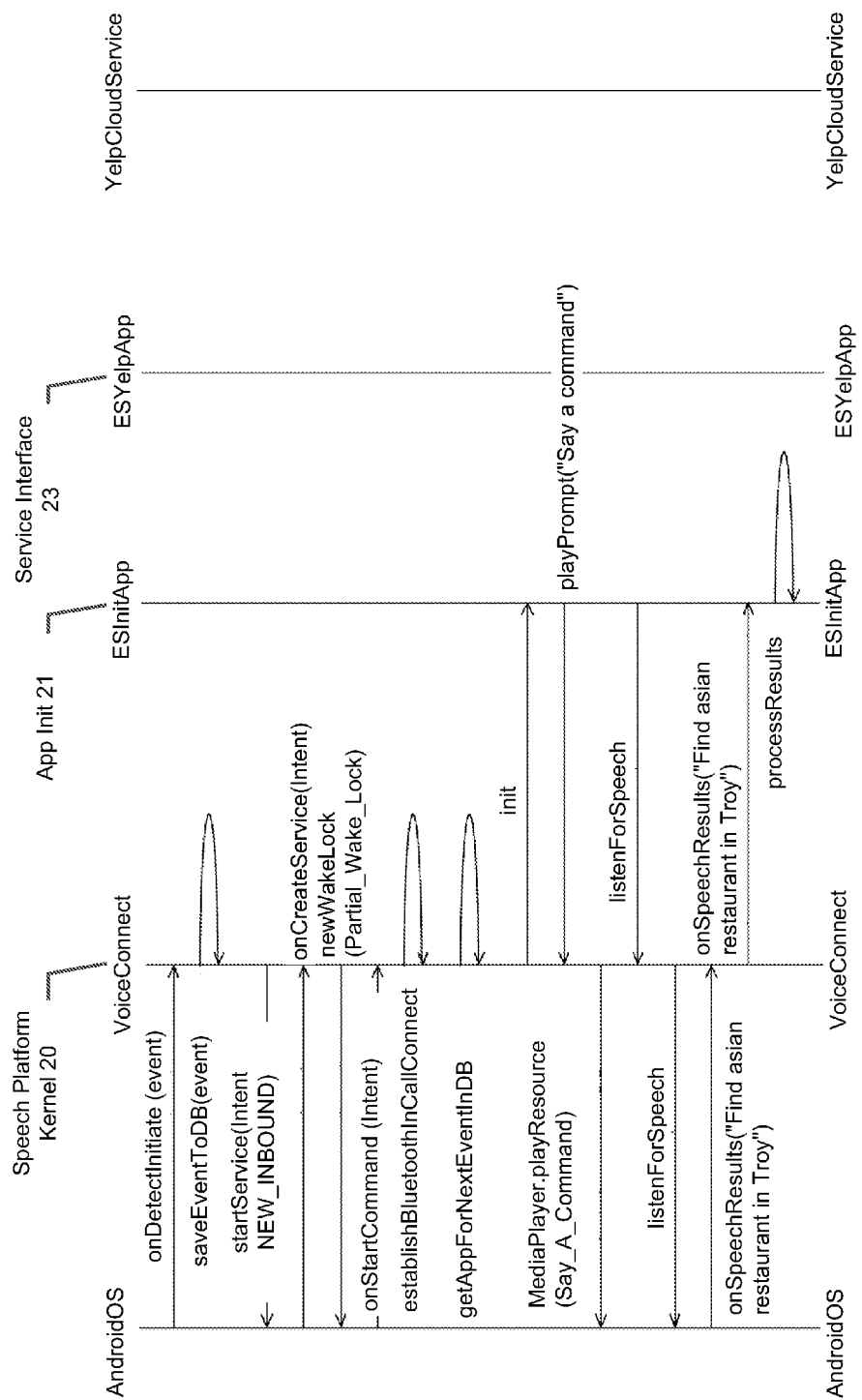
FIG. 8 comprises FIGS. 8A and 8B and is another sequence diagram showing messaging flows for another sample speech session.
Figure 8B:
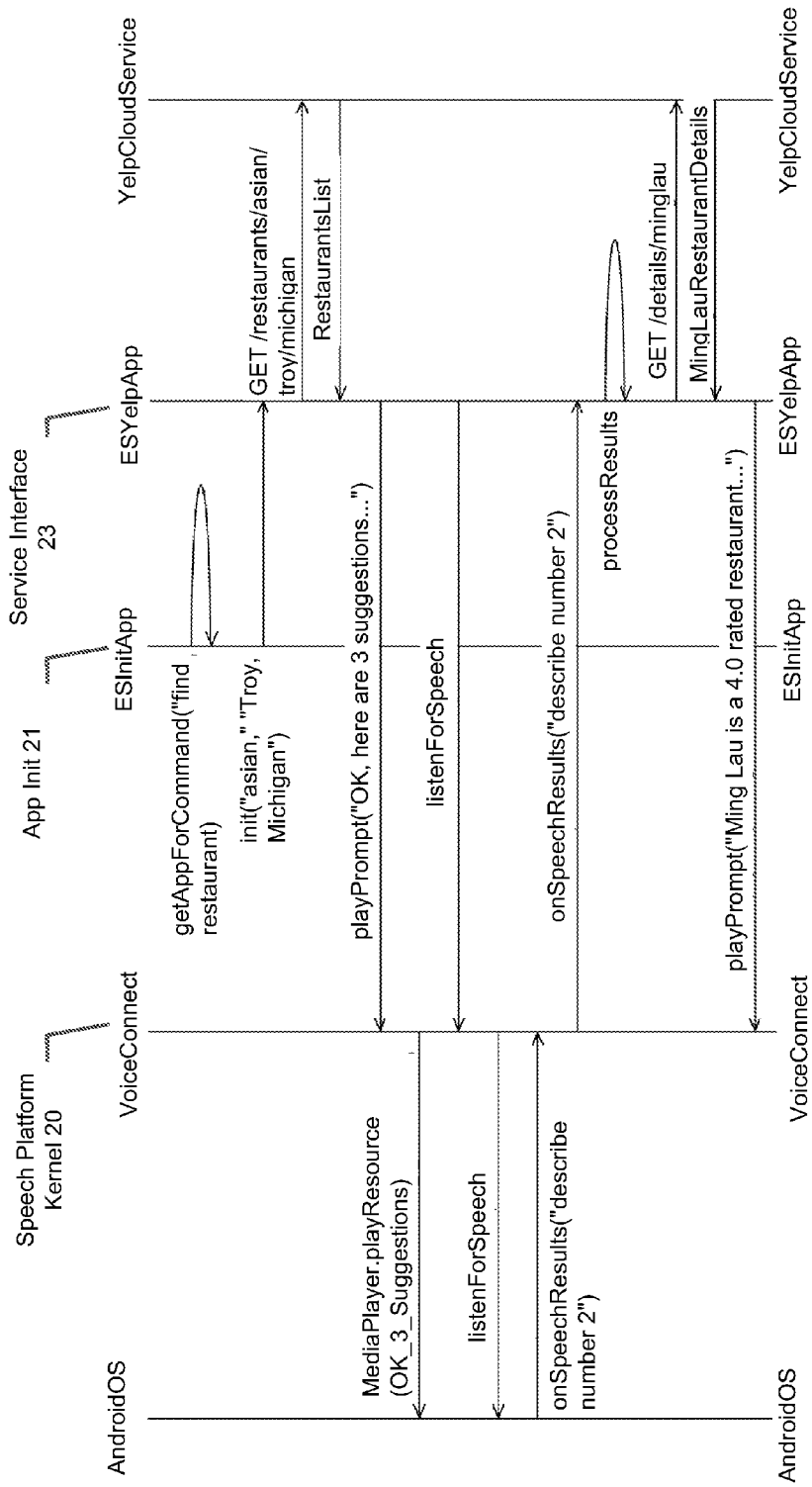

FIGS. 7 and 8 provide more detailed examples of a completed speech session showing the various inter-module and inter-device calls and sequences to request a service, obtain a result, and provide it to the vehicle driver, all via the audio user interface 14.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing hands-free services using a mobile device having wireless access to computer-based services, the method comprising carrying out a completed speech session via a mobile device without any physical interaction with the mobile device, wherein the speech session includes receiving a speech input from a user, processing the speech input into speech recognition results using an automatic speech recognition (ASR) process, identifying a primary session context from the speech recognition results, identifying an ancillary session context from the; recognition results, obtaining service results responsive to both the primary session context and the ancillary session context identified from the speech recognition results, and providing the service results to the user.

2. The method set forth in claim 1, wherein the method further comprises carrying out the speech session using the steps of:

(a) receiving the speech input at the mobile device via a short range wireless connection;
(b) identifying a cloud service associated with the primary session context or the ancillary session context;
(c) sending a service request to the cloud service;
(d) receiving the service result from the cloud service;
(e) generating a speech response using the service result; and
(f) sending the speech response as audio speech from the mobile device via the short range wireless connection.

3. The method set forth in claim 1, further comprising sending the speech input to a remote ASR service via a wireless communication system and receiving the recognition result from the ASR service via the wireless communication system.

4. The method set forth in claim 1, further comprising the steps of: processing the speech recognition result at the mobile device using one or more post-ASR grammars associated with different session contexts, and identifying the primary session context or ancillary session context based on the processing.

5. The method set forth in claim 2, wherein step (c) further comprises determining the service request using parameters supplied in the speech recognition result.

6. The method set forth in claim 2, wherein step (e) further comprises generating a text response and then obtaining a speech response by sending the text response to a cloud text-to-speech (TTS) service and receiving the speech response from the cloud TTS service.

7. The method set forth in claim 1, wherein the method is carried out using a vehicle having an installed vehicle audio interface, and wherein the speech session includes receiving the spoken input via the vehicle audio interface and sending the speech response to the vehicle audio interface for audible presentation in the vehicle.

8. The method set forth in claim 7, wherein the method further comprises sending the spoken input to a remote automated speech recognition (ASR) system, receiving speech recognition results from the ASR system, determining a service request from the speech recognition results, sending the service request to the cloud service, and receiving the service response from the cloud service.

9. A method of providing hands-free services using a mobile device having wireless access to computer-based services, comprising the steps of:
(a) receiving speech input at a mobile device via a wireless personal area network;
(b) sending the speech input from the mobile device to an automated speech recognition (ASR) system via a wireless communication system;
(c) receiving from the ASR system speech recognition results representing at least portions of the speech input;
(d) determining a primary session context and an ancillary session context at the mobile device based on the speech recognition results;
(e) determining desired services associated with the primary session context and the ancillary session context;
(f) sending service requests to the desired services;
(g) receiving service results from the desired services;
(h) generating a speech response using the service results; and
(i) sending the speech response as audio speech from the mobile device via the wireless personal area network.

10. The method set forth in claim 9, wherein step (f) comprises sending the service requests to an application installed on the mobile device and receiving the service result from the installed application.

11. The method set forth in claim 9, wherein step (f) comprises sending the service request to a cloud service and receiving the service result from the cloud service.

12. The method set forth in claim 9, wherein step (i) comprises generating a text response based on the service result, sending the text response to a text-to-speech (TTS) service via the wireless communication system, and receiving the speech response from the TTS service via the wireless communication system.

* * * * *